United States Patent [19]

Giangaspero et al.

[11] 3,890,401
[45] June 17, 1975

[54] METHOD OF PREPARATION OF ETHYLCYCLOHEXANE

[75] Inventors: Michele Giangaspero, Monfalcone; Giorgio Tlustos, Marino Bose; Domenico Corsi, Trieste, all of Italy

[73] Assignee: Aquila S.p.A., Trieste, Italy

[22] Filed: Dec. 27, 1973

[21] Appl. No.: 428,768

[30] Foreign Application Priority Data
Dec. 12, 1972 Italy................................. 33794/72

[52] U.S. Cl. .......... 260/667; 260/668 D; 260/674 A
[51] Int. Cl............................. C07c 5/10; C07c 7/00
[58] Field of Search............. 260/667, 668 D, 674 A

[56] References Cited
UNITED STATES PATENTS

| | | | |
|---|---|---|---|
| 2,282,231 | 5/1942 | Mahox | 260/674 A |
| 3,054,833 | 9/1962 | Donaldson et al. | 260/667 |
| 3,113,978 | 12/1963 | Derrig et al. | 260/674 A |
| 3,341,613 | 9/1967 | Hann | 260/667 |
| 3,384,676 | 5/1968 | Lester | 260/674 A |
| 3,458,589 | 7/1969 | Lester | 260/667 |
| 3,715,408 | 2/1973 | Brown | 260/674 A |

Primary Examiner—Delbert E. Gantz
Assistant Examiner—Veronica O'Keefe
Attorney, Agent, or Firm—Waters, Schwartz & Nissen

[57] ABSTRACT

A method for the preparation of ethylcyclohexane from an initial mixture of ethylbenzene and meta-xylene comprising effecting partial catalytic hydrogenation of the initial mixture to obtain a conversion of ethylbenzene to ethylcyclohexane between 50 to 99% and a conversion of xylene to between 10 and 50%, separating by distillation ethylcyclohexane and non-hydrogenated ethylbenzene in two steps from the partially hydrogenated mixture, the first of the steps comprising separating from the hydrogenate non-hydrogenated xylene and the second of the steps comprising separating a fraction containing ethylcyclohexane and non-hydrogenated ethylbenzene from the remainder of the hydrogenate, and then effecting total catalytic hydrogenation of the fraction containing ethylcyclohexane and non-hydrogenated ethylbenzene. According to a variant, after the partial catalytic hydrogenation non-hydrogenated xylene contained in the hydrogenate, is separated by distillation and then total catalytic hydrogenation of the rest of the hydrogenate is effected and, ethylcylohexane is separated.

16 Claims, 4 Drawing Figures

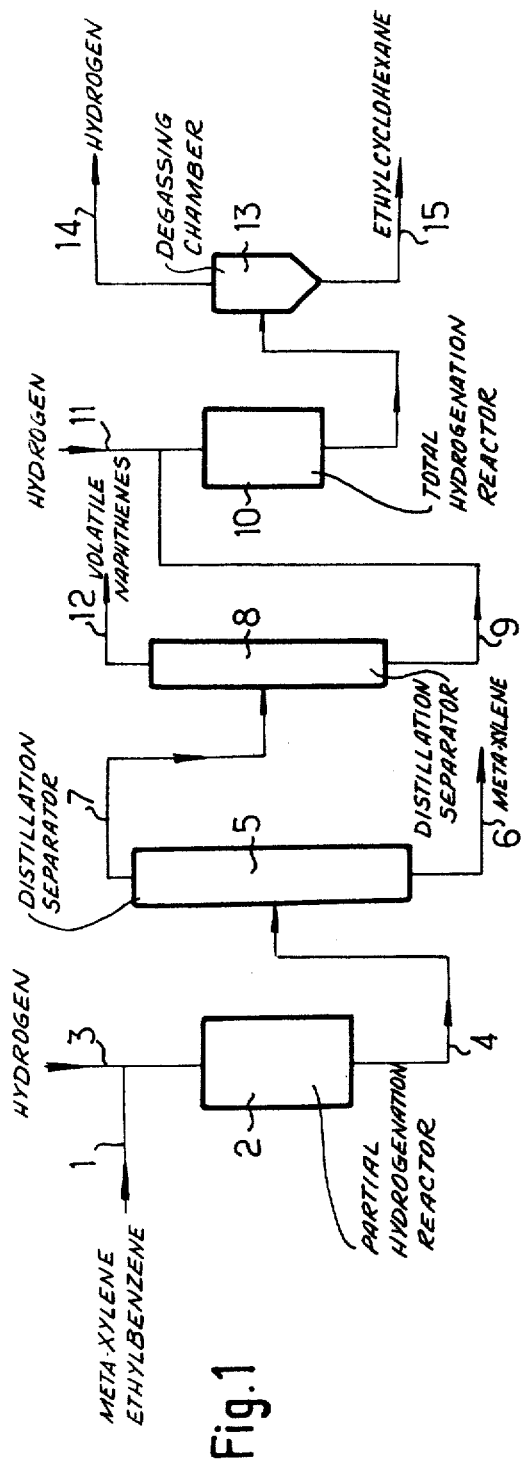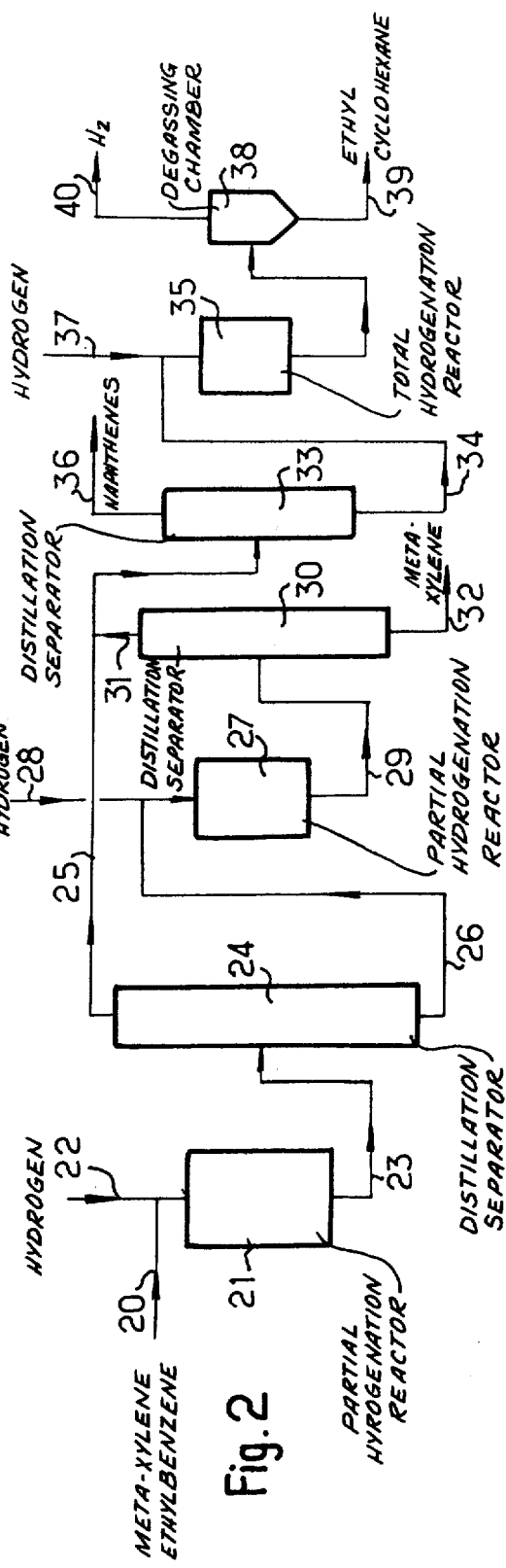

3,890,401

METHOD OF PREPARATION OF ETHYLCYCLOHEXANE

BACKGROUND

The present invention relates to a method of producing ethylcyclohexane from ethylbenzene contained in admixture with at least one of the xylene isomers of ethylbenzene.

Mixtures of xylene and ethylbenzene are obtained generally by catalytic reforming of gasoline, by the pyrolysis of gasoline (or cracking of its gases) or by dismutation of toluene.

Ortho-xylene is principally utilized as an intermediary in the manufacture of phthalic anhydride which is one of the major materials utilized in the manufacture of resin polyesters and plasticizers.

Para-xylene is in great demand since it leads to the production of terephthalic acid which can be used to produce dimethyl terephthalate which is utilized in the production of resin polyesters in the form of fibers or films.

Meta-xylene is less important and leads to the production of isophthalic acid which is used in the production of plasticizers.

Ethylcyclohexane is utilized as a solvent. It can be dehydrogenated to ethylbenzene or directly to styrene.

It is known that the separation of constituents of a mixture of aromatic hydrocarbons having eight atoms of carbon is difficult by reason of the proximity of the boiling points as shown in Table I hereafter.

TABLE I

|  | Boiling Point at atmospheric pressure °C | Crystallization Temperature °C |
| --- | --- | --- |
| Ethylbenzene | 136.2 | −94.9 |
| Para-xylene | 138.3 | +13.3 |
| Meta-xylene | 139.1 | −47.4 |
| Ortho-xylene | 144.1 | −25.2 |

Ortho-xylene can be separated by distillation from the other xylenes and ethylbenzene at the bottom of a column comprising between 100 and 150 plates whose rate of reflux is between 5 and 8.

Para-xylene can be separated from the other xylenes and ethylbenzene by conventional fractional crystallization or by selective adsorption on a molecular screen.

The separation of ethylbenzene from the xylenes is very costly since it requires a super-fractionation between 300 and 400 plates with a rate of reflux greater than 25.

An object of the invention is to provide a method for producing ethylcyclohexane from ethylbenzene contained in admixture with other aromatic hydrocarbons having eight atoms of carbon, said method comprising separating ethylbenzene from the other constituents of the mixture under conditions more economical than those currently existing.

U.S. Pat. No. 2,282,231 discloses a method in which the xylenes and ethylbenzene are hydrogenated, before separation by distillation of ethylcyclohexane and the naphthenes corresponding to the xylenes. The ethylcyclohexane is then dehydrogenated to ethylbenzene while the other napthenes can be sent, for example, for reforming. The purpose of this procedure resides in the existence of a greater difference between the boiling point of ethylcyclohexane and naphthenes as compared to the difference between ethylbenzene and xylenes. This is particularly true when the mixture to be hydrogenated does not include ortho-xylene whereby there will not be formed 1-2 dimethylcyclohexane. There is shown Table II herebelow the boiling point at atmospheric pressure of the alkyl-aromatic hydrocarbons having eight carbon atoms and their corresponding naphthenes.

TABLE II

| Ethylbenzene | 136.2°C | Orthoxylene | | 144.4°C |
| --- | --- | --- | --- | --- |
| Paraxylene | 138.3°C | Ethylcyclohexane | | 131.8°C |
| Metaxylene | 139.1°C | 1,4 Dimethyl-cyclohexane | | |
| | | | Trans | 119.2°C |
| | | | Cis | 124.3°C |
| | | 1,3 Dimethyl-cyclohexane | | |
| | | | Trans | 124.4°C |
| | | | Cis | 120.1°C |
| | | 1,2 Dimethyl-cyclohexane | | |
| | | | Trans | 123.3°C |
| | | | Cis | 129.6°C |

SUMMARY OF THE INVENTION

The method according to the present invention comprises a partial hydrogenation of the initial mixture contrary to the conventional methods which contemplate a total hydrogenation.

The method of the invention is directed to the production of ethylcyclohexane from an initial mixture containing ethylbenzene, meta-xylene and possibly para and ortho-xylene, said method comprising the following successive steps:

separating an initial fraction consisting essentially of ortho-xylene from the initial mixture when ortho-xylene is contained therein, effecting partial catalytic hydrogenation of the remainder of the mixture, after separation of para-xylene, if any, the conversion of ethylbenzene to ethylcyclohexane being limited to a value between 50 to 99% of the ethylbenzene present in the mixture to be hydrogenated and the conversion of the xylenes being between 10 and 50% of the xylenes present in the mixture, separating by distillation the ethyl cyclohexane and ethylbenzene which has not been hydrogenated, in two steps, in the first of which non-hydrogenated xylenes are separated from the hydrogenate and in the second the fraction containing ethylcyclohexane and non-hydrogenated ethylbenzene are separated from the remainder of the hydrogenate, and effecting total catalytic hydrogenation of the fraction containing ethylcyclohexane and non-hydrogenated ethylbenzene.

A further object of the present invention is to provide a method which comprises the following steps:

separating an initial fraction consisting essentially of ortho-xylene from the initial mixture when ortho-xylene is contained therein, effecting partial catalytic hydrogenation of the remainder of the mixture, after separation of para-xylene, if any, the conversion of ethylbenzene to ethylcyclohexane being limited to a value between 50 to 99% of the ethylbenzene present in the mixture to be hydrogenated and the conversion of the xylenes being between 10 and 50% of the xylenes present in the mixture, separating by distillation non-hydrogenated xylenes contained in the hydrogenate, effecting total catalytic hydrogenation of the hydrogenate fraction with the xylene removed, and separating by distillation ethylcyclohexane contained in the resulting hydrogenate of the total hydrogenation.

The method of the invention thus comprises two hydrogenations, i.e., a partial first hydrogenation and a second total hydrogenation.

The method can be effected according to two variants:

In the first variant, the charge for total hydrogenation is the fraction of the hydrogenate from the partial hydrogenation which contains ethylcyclohexane and non-hydrogenated ethylbenzene.

In the second variant the charge for the total hydrogenation is the fraction of the hydrogenate from the partial hydrogenation which contains ethylcyclohexane, hydrogenated xylenes and non-hydrogenated ethylbenzene. After total hydrogenation, ethylcyclohexane is separated from the hydrogenated xylenes.

It is known that the kinetics of the hydrogenation of different alkyl aromatic hydrocarbons having eight carbon atoms are not identical, e.g., ethylbenzene is more rapidly hydrogenated than xylenes. The method according to the invention comprises a partial hydrogenation of the charge and therefore a preferential hydrogenation of ethylbenzene which will hereafter be designated as "selective hydrogenation of ethylbenzene".

In order to obtain the best possible selectivity, it is preferable not to raise excessively the severity of the selective hydrogenation. Furthermore, it is not indespensible for totally hydrogenating the ethylbenzene in the mixture of aromatic hydrocarbons. In fact, the existence of an azeotropic mixture containing 86.1% by weight of ethylcyclohexane, and 13.9% by weight of ethylbenzene facilitates the separation of ethylbenzene from non-hydrogenated xylenes, the boiling point of the azeotropic mixture (131.6°C) being close to that of ethylbenzene (131.8°C).

The selective hydrogenation of the mixture containing ethylbenzene is preceded by the separation, by any known means of fractional distillation, of ortho-xylene when the mixture contains this isomer, this selective hydrogenation can be effected in accordance in the means utilized in this technique, thus a catalyst can be used containing platinum or nickel deposited on a support of alumina or silica or the like. There can also be used other non-isomeric catalysts containing, for example, chromium, molybdenium, copper, cobalt or palladum.

The selective hydrogenation is effected continuously at a temperature between 80° and 230°C, and preferably between 140° and 180°C at a pressure between 0.5 and 15 atmospheres and preferably between 0.5 and 5 atmospheres. The rate of feed of the charge liquid is between 0.1 and 10 and preferably 0.3 and 3 volumes per volume of catalyst per hour (v/v/h). The reaction is effected in the presence of 0.3 to 10 moles and preferably 0.5 to 3 moles of hydrogen per mole of aromatic hydrocarbon. The invention does not residue in any particular hydrogenation catalyst but in the fact that the hydrogenation is partial. The conversion of the ethylbenzene present in the initial mixture is generally between 50 and 99% while the conversion of the other xylenes is between 10 and 50%.

The selective hydrogenation can be effected in one or a number of stages. The conversion of the ethylbenzene contained in the charge in the case of a hydrogenation in a single stage is between 50 and 90% and preferably 65 to 85%. In the case of a hydrogenation in two stages, the conversion will be between 50 and 90% and preferably between 65 and 85% in the first stage and the total conversion after the second stage will be between 75 and 99% and preferably between 88 and 98%.

The hydrogenation in two stages permits recovery of a quantity of ethylbenzene, in each pass, greater than that recovered only in a single stage of hydrogenation (of equivalent purity); the quantity of non-hydrogenated xylenes recovered is much less when the selective hydrogenation is effected in two stages as compared to a single stage. In contrast, the purity of non-hydrogenated xylenes is much greater in the case of a hydrogenation in two steps.

In the first variant of the method, the separation of the ethylcyclohexane from the other constituents after the selective hydrogenation comprises two steps, the first consisting of separation non-hydrogenated xylenes from the rest of the hydrogenate containing additionally a little ethylbenzene and the second consisting of separating ethylcyclohexane containing a little ethylbenzene and naphthenes formed by hydrogenation of the xylenes. This can be effected by successive distillations.

The total hydrogenation of the fraction containing ethylcyclohexane and non-hydrogenated ethylbenzene at the time of initial selective hydrogenation is intended to transform the totality of the ethylbenzene present in this fraction to ethylcyclohexane. It can be effected by any non-isomeric hydrogenation catalyst and in particular by those which have been described hereinabove with reference to the initial selective hydrogenation. The ethylcyclohexane introduced in the hydrogenation charge with the ethylbenzene is not affected by the hydrogenation.

In the second variant of the method, the subsequent separation of the selective hydrogenation of the fraction subjected to the total hydrogenation only comprises a single step in which there is separated, by distillation, the non-hydrogenated xylenes from the rest of the hydrogenate constituted by the ethylcyclohexane, the hydrogenated xylenes, and non-hydrogenated ethylbenzene.

The total hydrogenation of the charge is effected as in the first variant of the method but on a more substantial charge.

The hydrogenate is subjected to a separation, by distillation, by which there is recovered at the top of the column, the hydrogenated xylenes (the dimethylcyclohexanes) and at the bottom ethylcyclohexane.

BRIEF DESCRIPTION OF THE DRAWING

The annexed drawing is given without limitation to show various methods of the invention for the preparation of ethylcyclohexane from a mixture of ethylbenzene and meta-xylene.

In the drawing:

FIG. 1 is a diagrammatic illustration of a first variant according to the invention comprising selective hydrogenation in a single stage, FIG. 2 is a diagrammatic illustration of the first variant comprising a hydrogenation in two stages.

DETAILED DESCRIPTION

Figure 3:
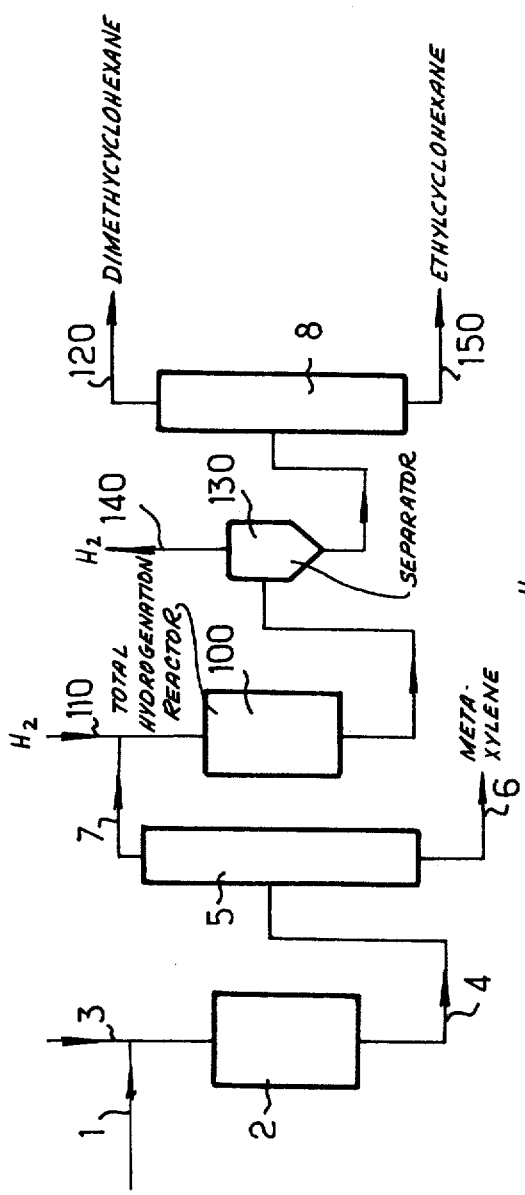
FIGS. 3 and 4 are diagrammatic illustrations of the second variant comprising a selective hydrogenation respectively in one and two stages.

With reference to FIG. 1 a charge consisting of 75% meta-xylene and 25% ethylbenzene is introduced in line 1 to a selective hydrogenation reactor 2 and hydrogen is introduced into the reactor via line 3. Such charge can be obtained by the following successive operations: catalytic reforming of naphtha, extraction of aromatic hydrocarbons (for example extractive distillation of sulfolane), separation of the $C_8$ aromatics by fractionation, separation of ortho-xylene at the bottom of a distillation tower, and separation of para-xylene by selective adsorption on a molecular screen.

The hydrogenation in reactor 2 is effected in the presence of a catalyst containing 45% nickel deposited on a support constituted of 15% silica and 25% alumina, neutralized by 0.3% sodium oxide. The operating conditions in reactor 2 are adjusted to obtain for ethylbenzene a conversion of 71% and for meta-xylene a conversion of about 17% to 1,3-dimethylcyclohexane.

The hydrogenate is fed via line 4 into an apparatus 5 for separation by distillation the bottom of which is at a temperature of 138°C and the top at 129°C. The apparatus comprises between 90–110 plates and has a rate of reflux of 4.5 to 6.5 with respect to the charge. In line 6 there is discharged the non-hydrogenated meta-xylene which is separated from the remainder of the hydrogenate which is discharged at the top of the column at line 7 and is introduced into a second separator 8 whose top is at a temperature of 122°C and whose bottom is at 131°C. The separator 8 contains between 70 and 90 plates and has a rate of reflux of 4 to 6 with respect to the charge. There is separated at line 9 ethylcyclohexane and a small amount of ethylbenzene which is fed to a total hydrogenation reactor 10 containing the same catalyst as reactor 2. Reactor 10 is fed with hydrogen by line 11 and the totality of ethylbenzene is transformed to ethylcyclohexane.

The most volatile naphthenes are conducted via line 12 to a reforming unit for example. The conversion of ethylcyclohexane is substantially total.

The ethylcyclohexane is degassed in chamber 13 and the gas discharged at line 14 is substantially pure hydrogen, which can be recycled to reactor 10. The ethylcyclohexane is recovered in line 15.

In the embodiment illustrated in FIG. 2, a charge identical to that described with reference to FIG. 1 is introduced by line 20 into a first partial hydrogenation reactor 21 fed with hydrogen via line 22 and containing the same catalyst as reactor 2 on FIG. 1. The conversion of ethylbenzene is 71% and that of meta-xylene is about 17%.

The hydrogenate is fed via line 23 to apparatus 24 for separation by distillation whose bottom is at a temperature of 138°C and whose top is at a temperature of 129°C. The separator 24 contains 90–100 plates and has a rate of reflux of 4.5 to 6.5 with respect to the charge. There is separated at the top, via line 25, naphthenes and a little non-hydrogenated ethylbenzene, and at the bottom, via line 26, non-hydrogenated meta-xylene and a little ethylbenzene. Line 26 leads to a second partial hydrogenation reactor 27 into which hydrogen is introduced via line 28. The hydrogenation is effected until the total conversion of the ethylbenzene present in the initial charge is equal to 91%, the total conversion of meta-xylene being equal to 31%. The hydrogenate is conducted by line 29 to a distillation separator 30 whose bottom is maintained at a temperature of 138°C and whose top is at a temperature of 129°C, the separator having 90–110 plates and a rate of reflux of 4.5 to 6.5. Naphthenes are separated at the top via line 31 and non-hydrogenated meta-xylene containing a little ethylbenzene are recovered in line 32. The meta-xylene has a purity of at least 96% and can be utilized as such where this degree of purity is sufficient. Lines 25 and 31 lead to distillation separator 33 whose bottom is at a temperature of 131°C and whose head is at a temperature of 122°C. Separator 33 has 70 to 90 plates and a rate of reflux of 4 to 6. Ethylcyclohexane with a small amount of ethylbenzene is led via line 34 to total hydrogenation reactor 35 while naphthenes are led via line 36 to a reforming unit, for example. The reactor 35 is fed with hydrogen via line 37. The hydrogenation of the ethylbenzene contained in the ethylcyclohexane takes place with substantially total conversion without secondary reactions. The ethylcyclohexane is degassed in degasser 38 and ethylcyclohexane is recovered in line 39 while a gas constituted by substantially pure hydrogen is recovered in line 40.

In the apparatus in FIG. 3, the same reference numerals are used to designate the same elements as in FIG. 1. FIG. 3 will be described only with reference to the differences between FIG. 1.

Line 7 leads to a total hydrogenation reactor 100 in which hydrogen is introduced via line 100.

The catalyst contained in reactor 100 is identical to that contained in reactor 2. The conversion of ethylbenzene present in the charge to reactor 100 is substantially complete. The hydrogenate is introduced into a separator 130 wherefrom a gas rich in hydrogen is separated via line 140 from the rest of the hydrogenate which is introduced into column 8 from which ethylcyclohexane is removed via line 150 while dimethylcyclohexane is removed via line 120.

Figure 4:
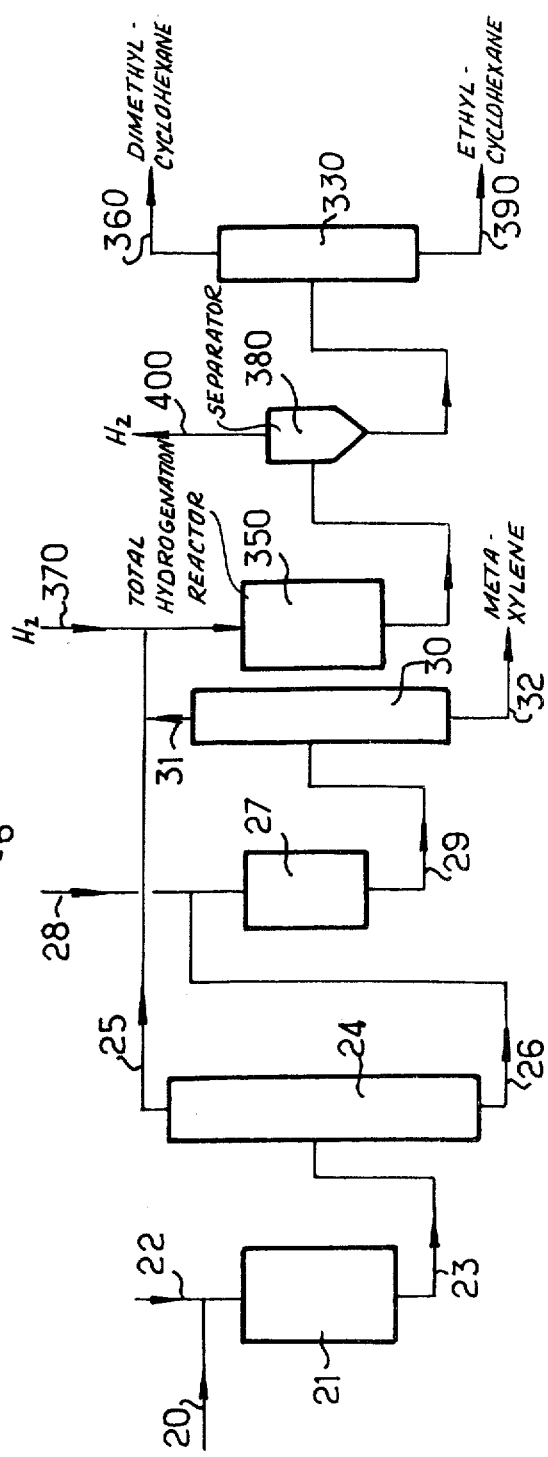

In the apparatus of FIG. 4 the same reference numerals are used to designate the same elements as in FIG. 2. FIG. 4 will be described only with reference to the differences between FIG. 2.

Lines 25 and 31 converge into a single line which is fed into a total hydrogenation reactor 350 fed with hydrogen via line 370. The catalyst contained in reactor 350 is identical to that contained in reactors 21 and 27. The conversion of ethylbenzene contained in the charge of reactor 350 is substantially complete. The hydrogenate is introduced into separator 380 which separates a gas rich in hydrogen at line 400 from the rest of the hydrogenate which is introduced into the column 330 from which ethylcyclohexane is removed at line 390 and dimethylcyclohexane at line 360.

When the charge subjected to hydrogenation contains only meta-xylene and ethylbenzene, the method described with reference to FIGS. 2 and 4 simultaneously yield ethylcyclohexane and meta-xylene. The recovery of meta-yxlene is partial, since line 32 only yields meta-xylene which has not been hydrogenated.

The charge subjected to selective hydrogenation in reactors 2 and 21 does not contain para-xylene, but it could contain same and its presence does not modify the process of the invention. At lines 6 and 32 there would be recovered a mixture of meta-xylene and para-xylene which would be subjected to an extraction of the para-xylene. At the top of columns 8 and 33, there would be recovered a mixture of 1,3 dimethylcyclohexane and 1,4 dimethylcyclohexane.

For a given production of ethylcyclohexane, the total hydrogenation reactors 100 and 350 can treat a greater charge than the reactors 10 and 35 for an equivalent quantity of hydrogenable material. However, the second variant of the method (FIGS. 3 and 4) has the advantage that the separation which is effected either in column 5 or in columns 24 and 30 can be less rigorous since the non-separated xylenes will be hydrogenated in reactors 100 or 350 and separated from ethylcyclohexane via lines 120 and 360.

Columns 5, 24 and 30 of the second variant of FIGS. 3 and 4 can be less active than the corresponding column of FIGS. 1 and 2 of the first embodiment, if a lower recovery of the xylenes at lines 6 and 32 is acceptable.

DESCRIPTION OF PREFERRED EMBODIMENTS

The invention will now be described with reference to the following examples.

EXAMPLE I

This example is directed to the catalytic selective hydrogenation phase.

There will next be successively studied catalysts $C_1$ to $C_6$ whose compositions are summarized in Table III hereafter.

TABLE III

| Catalyst | Composition (by weight) | | | Specific Surface ($m^2/g$) |
|---|---|---|---|---|
| | % Ni | % other constituents | Support | |
| $C_1$ | 45 | $Na_2O$ (0.3%) | $Al_2O_3$ (25%) $SiO_2$ (15%) | 200–230 |
| $C_2$ | 10–11 | Cu (3%) Cr (0.2%) | $SiO_2$ (65%) | 120–150 |
| $C_3$ | 8 | Cu (2%) Cr (0.7%) | $SiO_2$ | 110 |
| $C_4$ | 60–54 | — | Kieselguhr | 120 |
| $C_5$ | 58 | — | Alumina | 125 |
| $C_6$ | | Pt (0.75%) Li (0.5%) Ce (0.2%) | Alumina | 200 |

The catalysts are subjected to a preliminary reduction treatment of 350°C in a current of hydrogen.

A mixture of a charge of 75% meta-xylene and 25% ethylbenzene is passed on 150 cm³ of catalyst in the presence of hydrogen.

The operative conditions and the results of the runs are summarized in Table IV wherein the following expressions are given:

$\phi_{EB}$ = conversion of ethylbenzene =

$1 - \dfrac{\text{quantity of ethylbenzene at outlet of reactor}}{\text{quantity of ethylbenzene at inlet of reactor}}$ $\phi_{MX}$ = conversion of meta-xylene =

$1 - \dfrac{\text{quantity of meta-xylene at outlet of reactor}}{\text{quantity of meta-xylene at inlet of reactor}}$ $S$ = selectivity to ethylcyclohexane = $\dfrac{\phi_{EB}}{\phi_{MX}}$

TABLE IV

| Run | Catalyst | Pressure (bars) | Temperature (°C) | VVH | EB | MX | S | $H_2$/HC (moles) |
|---|---|---|---|---|---|---|---|---|
| 1 | $C_1$ | 1 | 175 | 0.5 | 71 | 17 | 4.18 | 1.5 |
| 2 | $C_1$ | 1 | 174 | 0.3 | 76 | 22 | 3.40 | 1.1 |
| 3 | $C_1$ | 1 | 160 | 1.0 | 51 | 10 | 5.10 | 1.1 |
| 4 | $C_2$ | 1 | 165 | 1.0 | 80 | 34 | 2.36 | 2.2 |
| 5 | $C_3$ | 1 | 170 | 2.0 | 58 | 19 | 3.06 | 2.2 |
| 6 | $C_4$ | 1 | 170 | 0.4 | 64 | 15 | 4.28 | 1.1 |
| 7 | $C_5$ | 1 | 153 | 1.0 | 67 | 15 | 4.5 | 2.0 |
| 8 | $C_6$ | 4 | 180 | 0.5 | 56 | 21 | 2.6 | 0.75 |

This example shows that the partial hydrogenation can be effected with a satisfactory selectivity by utilizing non-isomeric catalysts under the following reaction conditions:

| | |
|---|---|
| Temperature | 150–180° |
| Volume of charge per volume of catalyst per unit time (VVH) | 0.3 – 2 |
| $H_2$/aromatic hydrocarbons | 1–3 (in moles) |
| Pressure | 1–5 atmospheres |

EXAMPLE II

This example is directed to the separation of ethylcyclohexane and of non-hydrogenated ethylbenzene from the mixture after selective hydrogenation.

A charge whose composition is given in Table V hereafter has been fractionated in two distillation columns of 50 plates each in series. The conditions are the following:

| | |
|---|---|
| Temperature at the top of the second column | 128°C |
| Temperature at the bottom of the first column | 140°C |
| Pressure | atmospheric |
| Rate of reflux with respect to the charge | 6/1 |

Table V gives the compositions of the charge and of the fractions at the top and bottom.

TABLE V

| Components | Amounts (g) | | | Composition (%) | | |
|---|---|---|---|---|---|---|
| | Charge | Top | Bottom | Charge | Top | Bottom |
| 1-3 dimethyl-cyclohexane | 50.80 | 50.69 | 0.11 | 12.70 | 38.10 | 0.04 |
| Ethyl-cyclohexane | 70.80 | 70.00 | 0.80 | 17.70 | 52.53 | 0.30 |
| Ethylbenzene | 29.20 | 12.21 | 16.99 | 7.30 | 9.16 | 6.37 |
| Meta-xylene | 249.20 | 0.28 | 248.92 | 62.30 | 0.21 | 93.29 |
| TOTAL | 400.00 | 133.18 | 266.82 | 100.00 | 100.00 | 100.00 |

When the method is effected according to the second variant, the fraction at the top of the column serves as the charge to the total hydrogenation reactor (see Example III).

When the method is effected according to the first variant, the fraction at the top is subjected to a second fractionation. This has been effected as follows in which the second fractionation system comprises 90 plates:

| | |
|---|---:|
| Temperature at the top of the column | 121.5°C |
| Temperature at the bottom of the column | 134°C |
| Pressure | atmospheric |
| Rate of reflux with respect to the charge | 4.5/1 |

Table VI hereafter shows the compositions of the charge and the fractions at the top and bottom of the column.

TABLE VI

| Components | Amounts (g) | | | Composition (%) | | |
|---|---|---|---|---|---|---|
| | Charge | Top | Bottom | Charge | Top | Bottom |
| 1-3 Dimethyl-cyclohexane | 50.69 | 50.69 | — | 38.10 | 99.18 | — |
| Ethyl-cyclohexane | 70.00 | 0.35 | 69.65 | 52.53 | 0.68 | 84.90 |
| Ethylbenzene | 12.21 | 0.06 | 12.15 | 9.16 | 0.14 | 14.80 |
| Meta-xylene | 0.28 | — | 0.28 | 0.21 | — | 0.30 |
| TOTAL | 133.18 | 51.10 | 82.08 | 100.00 | 100.00 | 100.00 |

When the method is effected according to the first variant, the fraction at the bottom serves as the charge of the total hydrogenation reactor.

TABLE VII

| Components | Amounts (g) | |
|---|---|---|
| | Charge | Hydrogenate |
| 1-3 dimethylcyclohexane | 38.20 | 38.93 |
| Ethylcyclohexane | 52.00 | 61.60 |
| Ethylbenzene | 9.10 | 0.04 |
| Meta-xylene | 0.70 | 0.01 |
| TOTAL | 100.00 | 100.58 |
| Hydrogen | 0.58 | 0 |

The hydrogenate is introduced in a fractional separator having 90 plates and operating under the following conditions:

| | |
|---|---:|
| Temperature at the top of the column | 121.5°C |
| Temperature at the bottom of the column | 134°C |
| Pressure | atmospheric |
| Rate of reflux with respect to the charge | 4.5/1 |

Table VII hereafter shows the compositions of the charge and of the fractions recovered at the top and bottom of the column.

TABLE VIII

| | Amount (g) | | | Composition (%) | | |
|---|---|---|---|---|---|---|
| | Charge | Top | Bottom | Charge | Top | Bottom |
| 1-3 dimethyl-cyclohexane | 38.93 | 38.93 | 0 | 38.65 | 99.16 | 0 |
| Ethyl-cyclohexane | 61.60 | 0.33 | 61.27 | 61.30 | 0.84 | 99.91 |
| Ethylbenzene | 0.04 | 0 | 0.04 | 0.04 | 0 | 0.07 |
| Meta-xylene | 0.01 | 0 | 0.01 | 0.01 | 0 | 0.02 |
| TOTAL | 100.58 | 39.26 | 61.32 | 100.00 | 100.00 | 100.00 |

EXAMPLE III

This example is directed to the total hydrogenation of ethylbenzene in the second variant as well as the subsequent separation of ethylcyclohexane.

There is introduced into a hydrogenation reactor a charge whose composition is given in Table VII. There is also given in Table VII the composition of the hydrogenate.

The conditions of hydrogenation are the following:

| | |
|---|---:|
| Type of catalyst: C$_1$ in Table III | |
| Weight of catalyst | 150 g |
| VVH of the liquid charge | 1 |
| Temperature | 185°C |
| Pressure | atmospheric |
| Molar ratio H$_2$/aromatic hydrocarbons = 5–7 | |

We claim:

1. A method for the preparation of ethylcyclohexane from an initial mixture of ethylbenzene and meta-xylene, said method comprising
effecting partial catalytic hydrogenation of said initial mixture to obtain a conversion of ethylbenzene in said mixture to ethylcyclohexane of between 50 to 99% and conversion of meta-xylene in said mixture between 10 and 50%.
separating by distillation in two steps ethylcyclohexane and non-hydrogenated ethylbenzene from the partially hydrogenated mixture, the first of said steps comprising separating from the hydrogenate the non-hydrogenated meta-xylene and the second of said steps comprising separating a fraction containing ethylcyclohexane and non-hydrogenated ethylbenzene from the remainder of the hydrogenate, and effecting total catalytic hydrogenation of said fraction containing ethylcyclohexane and non-hydrogenated ethylbenzene.

2. A method as claimed in claim 1 wherein said partial catalytic hydrogenation is effected in a single stage, the conversion of ethylbenzene being between 50 and 90%.

3. A method as claimed in claim 2 wherein the conversion of ethylbenzene is between 65 and 85%.

4. A method as claimed in claim 1 wherein the partial catalytic hydrogenation is effected in two stages, the charge in the first stage being said initial mixture, separating, by distillation from the hydrogenate of said first stage of partial hydrogenation, meta-xylene and non-hydrogenated ethylbenzene, and effecting the second stage of partial hydrogenation on the latter separated product.

5. A method as claimed in claim 4 comprising distilling the hydrogenate of the second stage of partial hydrogenation to separate non-hydrogenated meta-xylene, combining the remainder of this hydrogenate with the product of the first stage of partial hydrogenation, and distilling the combined product to separate ethylcyclohexane and non-hydrogenated ethylbenzene, the total catalytic hydrogenation being effected on the latter separated constituents.

6. A method as claimed in claim 4 wherein the conversion of ethylbenzene in the first stage of partial hydrogenation is between 50 and 95% and after the second stage of partial hydrogenation between 75 and 99%.

7. A method as claimed in claim 4 wherein the conversion of ethylbenzene in the first stage of partial hydrogenation is between 65 and 85% and after the second stage of partial hydrogenation between 88 and 98%.

8. A method for the preparation of ethylcyclohexane from an initial mixture of ethylbenzene and meta-xylene, said method comprising effecting partial catalytic hydrogenation of said initial mixture to obtain a conversion of ethylbenzene in said mixture to ethylcyclohexane of between 50 to 99% and conversion of meta-xylene in said mixture between 10 and 50% separating by distillation non-hydrogenated meta-xylene contained in the hydrogenate, effecting total catalytic hydrogenation of the hydrogenate from which the non-hydrogenated meta-xylene has been removed, and separating, by distillation, ethylcyclohexane contained in the hydrogenate resulting from the total hydrogenation.

9. A method as claimed in claim 8 wherein said partial catalytic hydrogenation is effected in a single stage, the conversion of ethylbenzene being between 50 and 90%.

10. A method as claimed in claim 9 wherein the conversion of ethylbenzene is between 65 and 85%.

11. A method as claimed in claim 8 wherein the partial catalytic hydrogenation is effected in two stages, the charge in the first stage being said initial mixture, separating, by distillation from the hydrogenate of said first stage of partial hydrogenation, meta-xylene and non-hydrogenated ethylbenzene, and effecting the second stage of partial hydrogenation on the latter separated product.

12. A method as claimed in claim 11 comprising distilling the hydrogenate of the second stage of partial hydrogenation to separate non-hydrogenated meta-xylene, and combining the remainder of this hydrogenate with the rest of the hydrogenate of the first stage of hydrogenation to form the charge to be subjected to total catalytic hydrogenation.

13. A method as claimed in claim 11 wherein the conversion of ethylbenzene in the first stage of partial hydrogenation is between 50 and 95% and after the second stage of partial hydrogenation between 75 and 99%.

14. A method as claimed in claim 11 wherein the conversion of ethylbenzene in the first stage of partial hydrogenation is between 65 and 85% and after the second stage of partial hydrogenation between 88 and 98%.

15. A method as claimed in claim 8 comprising separating ortho-xylene and para-xylene from said initial mixture when contained therein prior to the partial hydrogenation step.

16. A method as claimed in claim 1 comprising separating ortho-xylene and para-xylene from said initial mixture when contained therein prior to the partial hydrogenation step.

* * * * *

UNITED STATES PATENT OFFICE
CERTIFICATE OF CORRECTION

Patent No. 3,890,401    Dated June 17, 1975

Inventor(s) Michele Giangaspero, et al

It is certified that error appears in the above-identified patent and that said Letters Patent are hereby corrected as shown below:

Item [30] should read -- 12-29-72   Italy --- 33784/72 --.

Signed and Sealed this twenty-seventh Day of January 1976

[SEAL]

Attest:

RUTH C. MASON
*Attesting Officer*

C. MARSHALL DANN
*Commissioner of Patents and Trademarks*